United States Patent [19]
Deschamps et al.

[11] Patent Number: 6,164,196
[45] Date of Patent: Dec. 26, 2000

[54] PRESS FOR FOOD PRODUCTS, SUCH AS FRUITS OR VEGETABLES, AND KITCHEN ROBOT COMPRISING SUCH A PRESS

[75] Inventors: Joel Deschamps, Mayenne; Marc Marriere, Ambrieres les Vallees, both of France

[73] Assignee: Moulinex S.A., Paris, France

[21] Appl. No.: 09/341,178

[22] PCT Filed: Dec. 31, 1997

[86] PCT No.: PCT/FR97/02468

§ 371 Date: Sep. 2, 1999

§ 102(e) Date: Sep. 2, 1999

[87] PCT Pub. No.: WO98/29016

PCT Pub. Date: Jul. 9, 1998

[30] Foreign Application Priority Data

Jan. 3, 1997 [FR] France .................................. 97 00029

[51] Int. Cl.[7] .............................. A23N 1/00; A23N 1/02
[52] U.S. Cl. ................................ 99/513; 99/492; 99/509; 99/510; 241/37.5; 241/92; 241/261; 366/314; 366/601
[58] Field of Search .............................. 99/484, 486, 489, 99/492, 495, 509–513; 210/380.1, 360.1; 241/278.1, 261, 282.1, 282.2, 37.5, 92, 261.1, 101.2, 199.12; 366/314, 601, 205, 206; 426/61, 63, 49, 52, 533, 599; 494/36, 43, 56, 58

[56] References Cited

U.S. PATENT DOCUMENTS

| | | | |
|---|---|---|---|
| 4,840,119 | 6/1989 | Caldi | 99/512 |
| 5,031,522 | 7/1991 | Brixel et al. | 99/511 |
| 5,421,248 | 6/1995 | Hsu | 99/512 |
| 5,433,144 | 7/1995 | Lee | 99/513 X |
| 5,669,289 | 9/1997 | Chen | 99/511 |
| 5,761,993 | 6/1998 | Ling et al. | 241/92 X |
| 5,924,357 | 7/1999 | Chen | 210/360.1 |

FOREIGN PATENT DOCUMENTS

| | | |
|---|---|---|
| 0 570 691 | 11/1993 | European Pat. Off. . |
| 0570691 | 11/1993 | European Pat. Off. . |
| 415986 | 1/1967 | Germany . |
| 1 250 071 | 9/1967 | Germany . |
| 1250071 | 9/1967 | Germany . |
| 415 986 | 1/1967 | Switzerland . |

*Primary Examiner*—Timothy Simone
*Attorney, Agent, or Firm*—Young & Thompson

[57] ABSTRACT

A press for food products adapted to be reduced to a puree, comprising a working bowl (12) closed by a removable cover (21) and enclosing a rotatable press tool (23) comprising a central vertical shaft (27) which carries at least one pressing blade (30) whose external edge extends toward the lateral wall of the bowl (12), and which is coupled in rotation to a drive shaft (19) of a motor group by means of a coupling device (38). The blade (30) is maintained in contact against a sieve (40) fixed under the action of a return spring (44) associated with the blade-carrying shaft (27) so as to effect, upon turning, the pressing and the passage of the food products through the sieve, and the assembly formed by the blade (30) and the shaft (27) which carries the blade (30) being moreover adapted, in the case in which the blade (30) encounters a hard body, to rise against the force of the return spring (44). The blade-carrying shaft (27) of the drive shaft (19) uncouples when the assembly formed by the blade (30) and the blade-carrying shaft (27) rises.

6 Claims, 4 Drawing Sheets

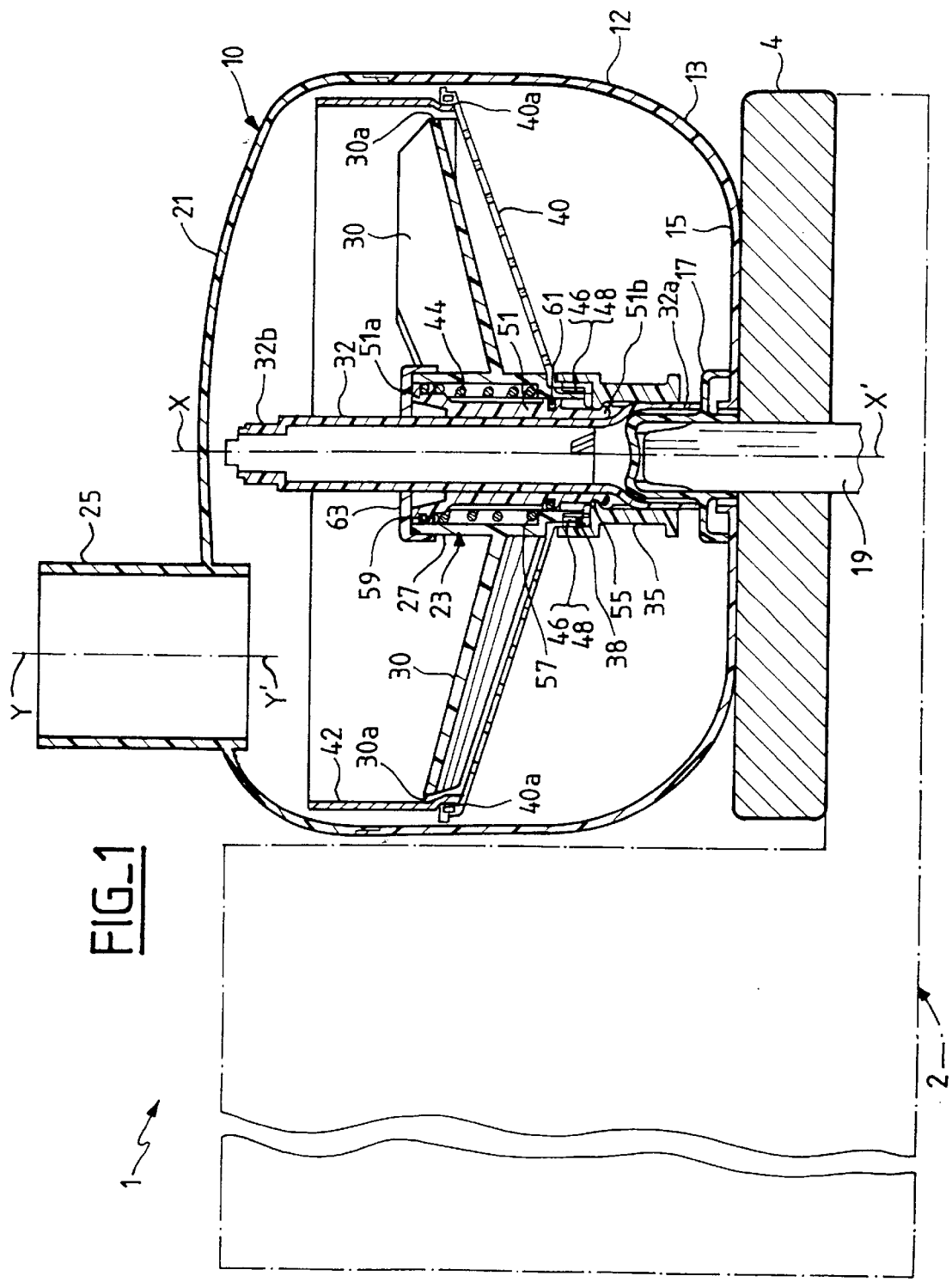
FIG_1

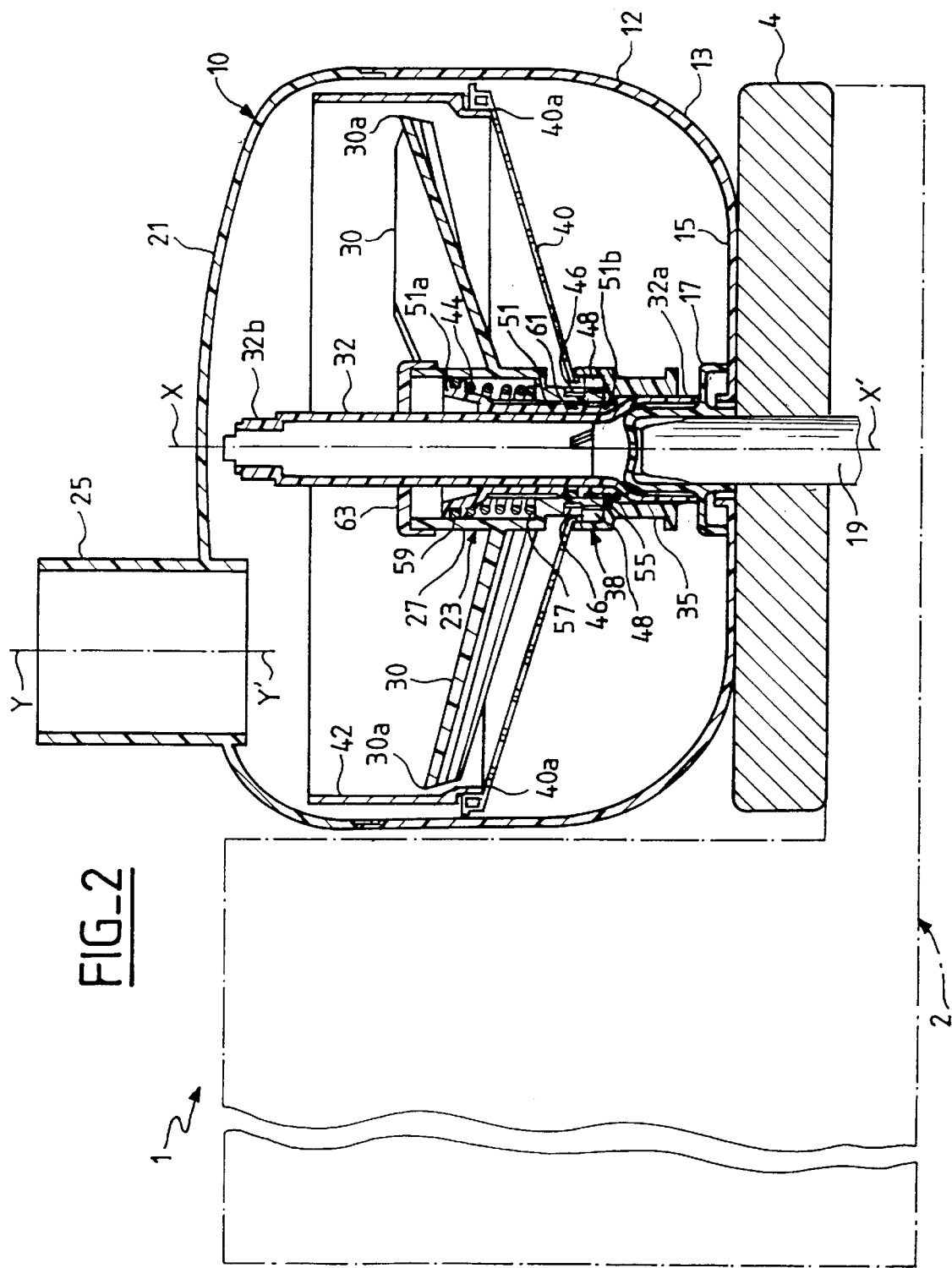
FIG_2

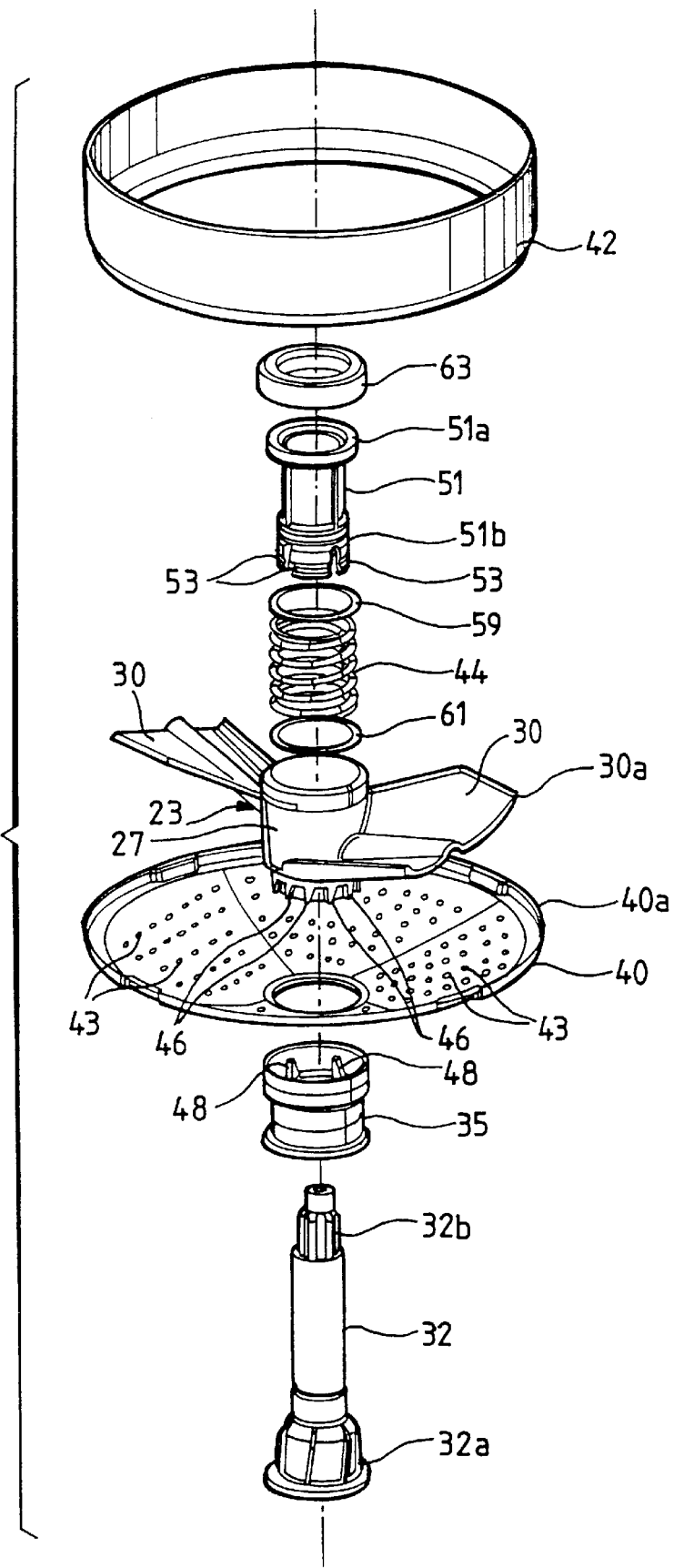
FIG_3

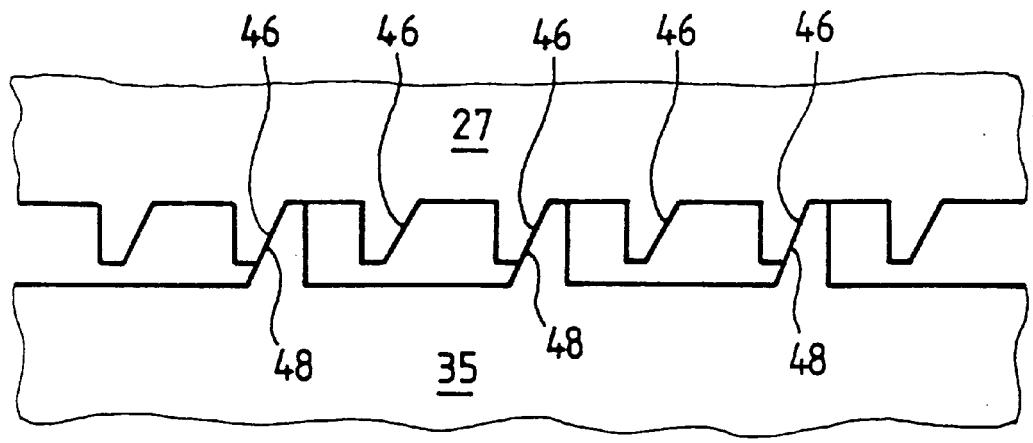
FIG_4
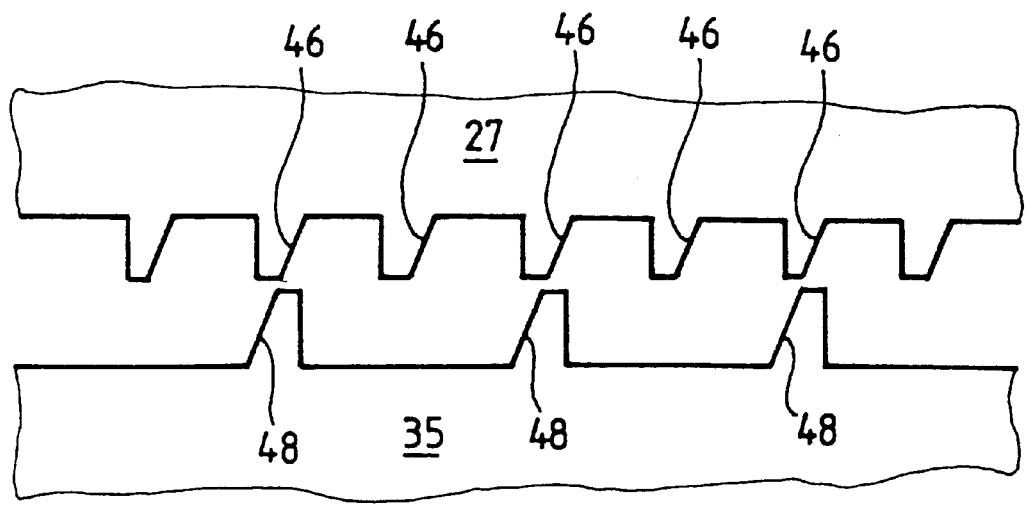
FIG_5

PRESS FOR FOOD PRODUCTS, SUCH AS FRUITS OR VEGETABLES, AND KITCHEN ROBOT COMPRISING SUCH A PRESS

FIELD OF THE INVENTION

The present invention relates to a press, particularly for domestic use, for food products, such as fruits or vegetables adapted to be reduced to a puree, and which is adapted particularly but not exclusively to be mounted on an electric kitchen apparatus called a kitchen appliance which, by the securement of various tools such as knives, scraper disks, chopping disks, etc. on the shaft of an electric motor, permits carrying out preparations of various foods.

It concerns more particularly a press of this type comprising a working bowl closed by a removable cover and enclosing a rotatable press tool comprising a vertical central shaft which carries at least one pressing blade whose outer edge extends toward the lateral wall of the bowl, and which is coupled in rotation to a drive shaft of a motor group by means of a coupling device, said blade being maintained in contact against a fixed sieve under the influence of a return spring associated with the blade-carrying shaft so as to cause, when turning, the pressing and the passage of the food products through the sieve, and the assembly formed by the blade and the shaft which carries it being moreover adapted, in the case in which the blade encounters a hard body, to rise against the force of the return spring.

There is to be understood by a hard body, a body which has abnormally high resistance, such as for example a large apricot pit during the preparation of apricot nectar.

BACKGROUND OF THE INVENTION

In a known press of this type, in the case of the introduction of a hard body into the products to be pressed, this hard body, upon pressing, will wedge laterally against the external edge of the blade and the lateral wall of the working bowl, thus blocking the blade and leading to an abnormal heating of the motor which thus can be damaged.

To overcome this risk, it has already been proposed to arrange in the supply circuit of the motor a thermal protective device, for example of the thermostatic detector type, adapted to cut the supply to the motor when the detected temperature exceeds a given threshold. However, such a thermal protective device is particularly costly, sizable and requires precise adjustment which is difficult to obtain.

OBJECT OF THE INVENTION

The invention has particularly for its object to overcome these drawbacks and to provide at lowest cost a press of the type described above, which permits in a simple way avoiding any deterioration of the motor group arising from lateral wedging of the blade due to a hard body introduced into the products to be pressed.

SUMMARY OF THE INVENTION

According to the invention, the coupling device of the blade-carrying shaft of the press tool with the drive shaft of the motor group also constitutes a device adapted to uncouple the blade-carrying shaft of said drive shaft when the assembly formed by the blade and the blade-carrying shaft rises.

Thanks to this coupling device serving also to uncouple the blade-carrying shaft from the shaft of the motor group upon each rising of the blade-carrying shaft following the encounter of a hard body by the blade, there is provided a mechanical protection for the motor, and no longer a thermal protection as in the prior art, which will be simple and reliable, thereby permitting providing a press apparatus offering optimum guarantee of safety.

In a preferred embodiment of the invention, the coupling-uncoupling device of the blade-carrying shaft of the press tool, from the drive shaft of the motor group, is constituted by a disengageable clutch device.

The invention also provides a kitchen appliance, of the type comprising a housing enclosing a motor group and having a region forming a base outside of which the drive shaft of the motor group projects vertically, and on which is removably mounted a press according to the invention.

BRIEF DESCRIPTION OF THE DRAWINGS

The characteristics and advantages of the invention will become further apparent from the description which follows, by way of non-limiting example, with reference to the accompanying drawings, in which:

FIG. 1 is a vertical cross-sectional view of a press according to the invention mounted on a kitchen appliance, the press tool being represented in a position coupled with the shaft of the motor group;

FIG. 2 is a view similar to FIG. 1, showing the press tool in the position uncoupled from the shaft of the motor group;

FIG. 3 is an exploded perspective view, on a smaller scale, of the various constituents of the press according to the invention, before mounting in a working bowl;

FIG. 4 is a fragmentary developed diagram, on an enlarged scale, of the assembly formed by a shaft of the press tool and an intermediate ring, and illustrated in an engaged position; and FIG. 5 is a view similar to that of FIG. 4, but in which the shaft-ring assembly is in an uncoupled position.

DETAILED DESCRIPTION OF THE INVENTION

As shown in FIGS. 1 and 2, a kitchen appliance 1 comprises a housing 2 (shown schematically in broken lines) having a general L shape which encloses a motor group (not shown) and which has a region forming a base 4 on which is removably mounted, as an accessory, a press 10 adapted to crush and pass food products, such as fruits or vegetables, so as to reduce them to a puree so as to produces purees, for example of potatoes, or nectars.

In the embodiment illustrated in FIG. 1, the press 10 comprises a working bowl or receptacle 12 having a sidewall 13 of generally cylindrical form with a vertical central axis XX', and a horizontal bottom wall 15 surmounted by a vertical central mounting 17 secured in rotation to an output or drive shaft 19 of the motor group which projects vertically from the base 4.

The working bowl 12 is closed by a removable cover 21 and encloses a rotatable press tool 23 which is adapted to be coupled with the drive shaft 19 of the motor group via the mounting 17.

The cover 21 comprises a hopper or feed tube 25 which has a vertical axis YY' eccentric relative to the axis XX' of the bowl 12, and into which are introduced the food products to be pressed.

The press tool 23, better seen in FIG. 3, comprises a vertical cylindrical shaft 27, hollow in this embodiment, carrying at least one profiled press blade 30, here in the number of two, diametrically opposed. Preferably, the press tool 23 is molded of a single piece, of a plastic material suitable for food contact. As shown in FIG. 1, the blade-carrying shaft 27 of the press tool 23 extends along the axis XX' and is coupled in rotation to a vertical hollow drive shaft 32 secured in rotation to the mounting 17, by means of a coaxial cylindrical ring 35.

In the embodiment shown in FIG. 1, the shaft 32 passes coaxially through the blade-carrying shaft 27 and has a lower end portion 30a which is engaged by coupling to the mounting 17, and which drives in rotation the ring 35 coupled to the blade-carrying shaft 27 by means of a coupling device 38, and an upper end portion 32b which is provided as a driver receiving if desired a disk (not shown) for preliminary scraping of the food products.

With respect to FIG. 1, a fixed sieve 40 is mounted between the blade-carrying shaft 27 and the ring 35, and has an external circular edge 40a, better seen in FIG. 3, which extends to the vicinity of the sidewall 13 of the bowl 12, and which carries removably a cylindrical skirt 42 extending upwardly. The sieve 40 (FIG. 3) is made from perforated sheet metal whose perforations 43 are calibrated as a function of the desired type of preparation.

As shown in FIG. 1, the blades 30, whose respective external edges 30a extend to adjacent the skirt 42, are each held in contact against the bottom of the sieve 40 under the action of a return spring 44 associated with the blade-carrying shaft 27 so as to cause, upon turning, the pressing and the passage of the foodstuffs through the sieve 40.

According to the invention, the coupling device 39 for the blade-carrying shaft 27 with the intermediate ring 35 connected in rotation to the drive shaft 19 of the motor group (FIG. 1), also constitutes a device adapted to uncouple the blade-carrying shaft 27 of the ring 35, and hence of said drive shaft 19, when the assembly formed by the blades 30 and the blade-carrying shaft 27 rise against the force of the return spring 44 (FIG. 2) by virtue of having come into contact, during pressing, with a hard body striking one of the blades 30.

In a preferred embodiment of the invention, this coupling-uncoupling device 38 of the blade-carrying shaft 27 relative to the drive shaft 19 of the motor group, is constituted by a disengageable clutch device. To this end, the base of the blade-carrying shaft 27 comprises a first series of spaced teeth 46, better seen in FIG. 3, provided about the external periphery of said shaft 27 and being directed away from the base, and which are adapted either to come into engagement with a second series of spaced teeth 48, better seen in FIG. 3, directed upwardly and provided on the internal periphery of the ring 35, when the blade-carrying shaft 27 and the ring 35 are coupled to each other in an engaged clutch position (FIGS. 1 and 4), or to separate the teeth 48 from each other when the blade-carrying shaft 27 and the ring are uncoupled from each other in an unclutched or disengaged position (FIGS. 2 and 5) upon a rise of the blade-carrying shaft 27 against the force of the spring 44, as shown in FIG. 2, consecutively to the encounter of a hard body by one of the blades 30.

In this embodiment, FIG. 1, a piece forming a cylindrical shaft 51 is mounted coaxially in the blade-carrying shaft 27, about the shaft 32, and has an upper end portion shaped as a ring 51a and a lower end portion 51b which projects from the blade-carrying shaft 27 and which is secured in rotation to the ring 35, for example by means of tongues 53 (FIG. 3) that snap engaged below a circular edge 55 (FIG. 1) formed within the ring 35. As shown in FIG. 1, the spring 44 is a coil compression spring which is mounted coaxially about the shaft 51, of which one end bears against the ring 51a of the shaft 51, and whose other end bears against an annular shoulder 57 formed on the internal surface of the blade-carrying shaft 27.

In FIGS. 1 and 3, there is shown at 59 and 61 two rings that engage on the shaft 51, and at 63 a crown forming a cap adapted to be fixed on the upper portion of the blade-carrying shaft 27 by any suitable securement means, after mounting the different pieces on this blade-carrying shaft.

To make for example apricot nectar, there is introduced into the hopper 25 apricots which fall onto the sieve 40 and which are driven in rotation in the skirt 42 by the blades 30 secured to the shaft 27 whose teeth 46 are in clutching engagement with teeth 48 of the ring 35 connected in rotation to the drive shaft 19 of the motor group, see FIGS. 1 and 4. The apricots are pressed against the sieve 40 by the blades 30 whose shaft 27, when one of the blades 30 encounters an apricot pit, rises against the force of the spring 44, to a height predetermined by the compression of the spring 44, such that the teeth 46 of the shaft 27 disengage by unclutching, while producing a slight clicking, from the teeth 48 of the ring 35, such that the blade-carrying shaft 27 is uncoupled from the drive shaft 19 of the motor group, see FIGS. 2 and 5. After passage of the blade 30 above the pit, the blade-carrying shaft 27 is returned by the spring 44 into the clutch engaged position as shown in FIG. 1. The pressed mass is pushed through the sieve 40, thereby producing an apricot nectar which flows into the bottom of the bowl 12.

If in the course of pressing apricots, a large pit wedges between the outer edge 30a of one of the blades 30 and the sidewall of the skirt 42, the teeth 46 of the blade-carrying shaft 27 rise along the corresponding teeth 48 of the rotating ring 35 such that the shaft 27 rises, and thus disengages by unclutching the teeth 48 from the ring 35 (FIGS. 2 and 5), which gives rise to the uncoupling of the shaft 27 of the drive shaft 19 of the motor group. Thanks to this mechanical uncoupling following wedging of the blade by the apricot pit, there is thus avoided any damage to the motor group. After stopping the apparatus and retrieving the pit wedging the blade, the blade-carrying shaft 27 is returned by the spring 42 into its clutch engaged position as shown in FIG. 1, and the production of apricot nectar thus proceeds.

What is claimed is:

1. In a press for food products adapted to be reduced to a puree, comprising a working bowl (12) closed by a removable cover (21) and enclosing a rotatable press tool (23) comprising a central vertical shaft (27) which carries at least one pressing blade (30) whose external edge extends toward the lateral wall of the bowl (12), and which is coupled in rotation to a drive shaft (19) of a motor group by means of a coupling device (38), said blade (30) being maintained in contact against a sieve (40) fixed under the action of a return spring (44) associated with the blade-carrying shaft (27) so as to effect, upon turning, the pressing and the passage of the food products through the sieve, and the assembly formed by the blade (30) and the shaft (27) which carries the blade (30) being moreover adapted, in the case in which the blade (30) encounters a hard body, to rise against the force of the return spring (44);

the improvement wherein the device (38) for coupling the blade-carrying shaft (27) of the press tool (23) with the drive shaft (19) of the motor group constitutes also a device adapted to uncouple the blade-carrying shaft (27) of said drive shaft (19) when the assembly formed by the blade (30) and the blade-carrying shaft (27) rises.

2. Press according to claim 1, wherein the coupling-uncoupling device (38) of the blade-carrying shaft (27) of the press tool (23) from the drive shaft (19) of the motor group is constituted by a disengageable clutch device.

3. Press according to claim 2, wherein the clutch device (38) comprises a first series of spaced teeth (46) provided on the external periphery of the blade-carrying shaft (27), at the base of this latter, directed downwardly and coming into engagement with a second series of spaced teeth (48), directed upwardly and provided on the internal periphery of an intermediate cylindrical ring (35) coaxial to the blade-carrying shaft (27) and connected in rotation to the drive shaft (19) of the motor group.

4. Press according to claim 3, wherein the blade-carrying shaft (27) is a hollow cylindrical shaft, a piece forming a cylindrical shaft (51) is mounted coaxially in the blade-carrying shaft (27) and has a lower end portion (51*b*) which projects from said blade-carrying shaft and which is secured in rotation to the ring (35), and the return spring (44) is a coil compression spring which is mounted coaxially about said shaft (51), one end of said spring bearing against a ring (51*a*) formed in the upper end portion of the shaft (51), and whose other end bears against an annular shoulder (57) formed on the internal surface of the blade-carrying shaft (27).

5. Press according to claim 1 wherein the sieve (40) has an external circular edge (40*a*) carrying a cylindrical skirt (42) which extends upwardly and which is interposed between the sidewall (13) of the bowl (12) and the external edge (30*a*) of the blade (30).

6. Kitchen appliance, comprising a housing (2) enclosing a motor group and having a region forming a base (4) outside of which the drive shaft (19) of the motor group projects vertically, wherein on the base (4) of the housing (2) is removably mounted a press (10) as defined in claim 1.

\* \* \* \* \*